United States Patent [19]

Rattenbury

[11] E Re. 29,523

[45] Reissued Jan. 24, 1978

[54] OLEFINIC POLYMERS STABILIZED WITH THIOACYL TRIVALENT PHOSPHORUS COMPOUNDS

[75] Inventor: Kenneth H. Rattenbury, Parkersburg, W. Va.

[73] Assignee: Borg-Warner Corporation, Chicago, Ill.

[21] Appl. No.: 761,390

[22] Filed: Jan. 21, 1977

Related U.S. Patent Documents

Reissue of:

[64] Patent No.: 3,773,716
Issued: Nov. 20, 1973
Appl. No.: 282,661
Filed: Aug. 22, 1972

[51] Int. Cl.[2] ..... C08L 23/02

[52] U.S. Cl. ..... 260/45.85 S; 260/45.7 PS; 260/45.85 H

[58] Field of Search ..... 260/45.85 S, 45.85 H, 260/45.7 PS

[56] References Cited

U.S. PATENT DOCUMENTS

| | | | |
|---|---|---|---|
| 2,824,847 | 2/1958 | Fath | 260/942 |
| 3,374,291 | 3/1968 | Myers | 260/942 |

FOREIGN PATENT DOCUMENTS

| | | | |
|---|---|---|---|
| 4,512,667 | 5/1970 | Japan | 260/45.85 S |
| 4,631,455 | 9/1971 | Japan | 260/45.85 S |

*Primary Examiner*—M. J. Welsh
*Attorney, Agent, or Firm*—Cushman, Darby & Cushman

[57] ABSTRACT

Compounds are prepared having one of the formulae

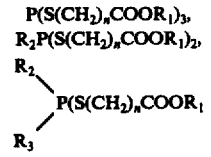

where $n$ is an integer of 1, 2 or 3 and $R_1$, $R_2$ and $R_3$ are hydrocarbyl or halohydrocarbyl. The compounds are useful as stabilizers for olefin polymers.

20 Claims, No Drawings

OLEFINIC POLYMERS STABILIZED WITH THIOACYL TRIVALENT PHOSPHORUS COMPOUNDS

Matter enclosed in heavy brackets [ ] appears in the original patent but forms no part of this reissue specification; matter printed in italics indicates the additions made by reissue.

This application is a substitute for application 884,014 filed Dec. 10, 1969 and now abandoned.

The present invention relates to the preparation of organic compounds having a P-S bond and their use in stabilizing monoolefin polymers and polyolefin polymers. Some of the organic compounds having a P-S bond are novel.

The compounds have one of the following formulae $$P(S(CH_2)_nCOOR_1)_3, \quad \text{I}$$

$$R_2-P(S(CH_2)_nCOOR_1)_2, \quad \text{II}$$

$$\begin{matrix} R_2 \diagdown \\ \qquad PS(CH_2)_nCOOR_1 \\ R_3 \diagup \end{matrix} \quad \text{III}$$

where n is an integer normally not over 10 and preferably 1, 2 or 3 and $R_1$, $R_2$ and $R_3$ are hydrocarbyl or halohydrocarbyl. Preferably the compounds have Formula I. $R_1$, $R_2$ and $R_3$ are desirably alkyl, alkenyl, haloalkyl, haloalkenyl, aryl, haloaryl, aralkyl or cycloalkyl. Most preferably $R_1$ is alkyl.

The compounds of the invention are made by reacting one mole of a compound having the formula $$HS(CH_2)_nCOOR_1 \quad \text{IV}$$

with (a) ⅓ mole of $PCl_3$ to form compounds of Formula I, (B) with ½ mole of $R_2PCl_2$ to form a compound of Formula II, and (c) with 1 mole of $$\begin{matrix} R_2 \diagdown \\ \qquad PCl \\ R_3 \diagup \end{matrix}$$

to form compounds of Formula III. The reaction is desirably carried out in the presence of a tertiary amine, e.g. pyridine, 2,6-lutidine, dimethyl aniline, trimethyl amine or triethyl amine in an amount sufficient to bind the HCl set free.

The preparation of trithiophosphates within Formula I is disclosed in Myers Patent 3,374,291. Myers employs his materials to improve oxidation stability and extreme pressure properties of lubricants.

Fath Patent 2,824,847 shows similar compounds as being useful for stabilizing halogen containing vinyl resins.

Grayson, Journal of Organic Chemistry, vol. 32 (1), pages 236–238, 1967, shows reacting $RPH_2+2R'SSR'$ to obtain $RP(SR')_2$ and reacting $R_2PH$ with $R'SSR'$ to obtain $R_2PSR'$. In a specific example, he reacts $$(i\text{-}C_4H_9)_2PH$$

with $(C_2H_5OOCCH_2CH_2S)_2$ to obtain $$(i\text{-}C_4H_9)_2PSCH_2CH_2COOC_2H_5$$

The compounds are useful as flame and fire retardants for solid hydrocarbon polymers, e.g. polyethylene, polypropylene, natural rubber and GR-S.

The compounds of the present invention are especially useful as stabilizers and antioxidants for polyethylene, polypropylene, EPDM rubber, natural rubber, polybutadiene, butadiene-styrene copolymer, butadiene-acrylonitrile copolymer, acrylonitrile-butadiene-styrene terpolymer (ABS) and poly cis-isoprene.

Mixtures of compounds of Formula IV can be used to make mixed esters of Formulae I, II and III.

As starting compounds having the formula $$\begin{matrix} R_2 \diagdown \\ \qquad PCl \\ R_3 \diagup \end{matrix}$$

there can be used methyl ethyl phosphinous chloride, dimethyl phosphinous chloride, diethyl phosphinous chloride, dipropyl phosphinous chloride, dibutyl phosphinous chloride, dioctyl phosphinous chloride, didecyl phosphinous chloride, dioctadecyl phosphinous chloride, diisopropyl phosphinous chloride, dicyclohexyl phosphinous chloride, di(trifluoromethyl) phosphinous chloride, methyl chloromethyl phosphinous chloride, di(trichloromethyl) phosphinous chloride, diphenyl phosphinous chloride, di(2,5-dimethylphenyl) phosphinous chloride, methylphenyl phosphinous chloride, di(4-methylphenyl) phosphinous chloride (also called di(p-tolyl) phosphinous chloride), ethyl phenyl phosphinous chloride, 4-bromophenyl phosphinous chloride, di(2-chlorophenyl) phosphinous chloride, di(4-chlorophenyl) phosphinous chloride, di(2-methylphenyl) phosphinous chloride, 4-methylphenyl phenyl phosphinous chloride, di(2,4,5-trimethylphenyl) phosphinous chloride, di(1-naphthyl) phosphinous chloride, di(4-nonylphenyl) phosphinous chloride and di(4-octadecylphenyl) phosphinous chloride.

As starting compounds having the formula $R_2PCl_2$ there can be used methane phosphorus dichloride, ethane phosphorus dichloride, propane phosphorus dichloride, butane phosphorus dichloride, 2-methylpropane phosphorus dichloride, pentane phosphorus dichloride, 2-methylbutane phosphorus dichloride, 3-methylbutane phosphorus dichloride, 2,2-dimethylpropane phosphorus dichloride, hexane phosphorus dichloride, heptane phosphorus dichloride, octane phosphorus dichloride, isooctane phosphorus dichloride, 2-ethylhexanephosphorus dichloride, decane phosphorus dichloride, isodecane phosphorus dichloride, dodecane phosphorus dichloride, hexadecane phosphorus dichloride, octadecane phosphorus dichloride, eicosane phosphorus dichloride, 2-chloroethane phosphorus dichloride, 3-chloropropane phosphorus dichloride, 2-chloropropane phosphorus dichloride, 4-chlorobutane phosphorus dichloride, 6-chlorohexane phosphorus dichloride, 10-chlorodecane phosphorus dichloride, 18-chlorooctadecane phosphorus dichloride, 20-chloroeicosane phosphorus dichloride, 2-propene phosphorus dichloride, 9-octadecene phosphorus dichloride, 1-naphthalene phosphorus dichloride, 2-naphthalene phosphorus dichloride, 2-butene phosphorus dichloride, 4-pentene phosphorus dichloride, 2-bromoethane phosphorus dichloride, 4-bromobutane phosphorus dichloride, benzene phosphorus dichloride, 2-methylbenzene phosphorus dichloride, 3-methylbenzene phosphorus dichloride, 4-methylbenzene phosphorus dichloride, 4-butylbenzene phosphorus dichloride, 4-octylbenzene phosphorus dichloride, 2-dodecylbenzene phosphorus dichloride, 4-nonylbenzene phosphorus dichloride, 2,4,6-trimethylbenzene phosphorus dichloride, 2-chlorobenzene phosphorus dichloride, 2,6-dimethylbenzene phosphorus dichloride, 4-chlorobenzene phosphorus dichloride, 3-bromobenzene phosphorus dichloride, 2,4-dichlorobenzene phosphorus dichloride, 2-chloro-4-methylbenzene phosphorus dichloride, phenylmethane phosphorus dichloride, cyclohexane phosphorus dichloride, cyclopentane phosphorus dichloride, 4-methylcyclohexane phosphorus dichloride.

Examples of compounds within Formula IV useful as starting materials are methyl thioglycolate $(HSCH_2COOCH_3)$, ethyl thiglycolate, propyl thiglycolate, isopropyl thioglycolate, butyl thiglycolate, sec. butyl thioglycolate, amyl thioglycolate, hexyl thioglycolate, cyclohexyl thioglycolate, heptyl thioglycolate, octyl thioglycolate, isooctyl thioglycolate, nonyl thioglycolate, decyl thioglycolate, 2-ethylhexyl thioglycolate, isodecyl thioglycolate, dodecyl thioglycolate, cetyl thioglycolate, octadecyl thioglycolate, eicosanyl thioglycolate, allyl thioglycolate, crotyl thioglycolate, oleyl thioglycolate, linoleyl thioglycolate, linolenyl thioglycolate, methallyl thioglycolate, 2-chloroallyl thioglycolate, 2-bromoallyl thioglycolate, 2-chloroethyl thioglycolate, 4-bromobutyl thioglycolate, phenyl thioglycolate, o-tolyl thioglycolate, m-tolyl thioglycolate, p-tolyl thioglycolate, 2,5-dimethylphenyl thioglycolate, 2-chlorophenyl thioglycolate, 2,4-dichlorophenyl thioglycolate, 2,4,5-trichlorophenyl thioglycolate, 2-chloro-4-methylphenyl thioglycolate, 2-bromophenyl thioglycolate, benzyl thioglycolate, 1-naphthyl thioglycolate, 2-naphthyl thioglycolate, 2-fluorophenyl thioglycolate, 4-methylcyclohexyl thioglycolate, methyl beta mercaptopropionate $(HSCH_2CH_2COOCH_3)$, ethyl beta mercaptopropionate, propyl beta mercaptopropionate, butyl beta mercaptopropionate, amyl beta mercaptopropionate, hexyl beta mercaptopropionate, isooctyl beta mercaptopropionate, decyl beta mercaptopropionate, octadecyl beta mercaptopropionate, cyclohexyl beta mercaptopropionate, phenyl beta mercaptopropionate, p-tolyl beta mercaptopropionate, allyl beta mercaptopropionate, oleyl beta mercaptopropionate, methyl gamma mercaptobutyrate $(HSCH_2CH_2CH_2COOCH_3)$, butyl gamma recapto butyrate, isooctyl gamma recapto butyrate, octadecyl gamma mercapto butyrate, oleyl gamma mercapto butyrate, allyl gamma mercapto butyrate, phenyl gamma mercapto butyrate, o-tolyl gamma mercapto butyrate.

In place of using the free mercapto compound of Formula IV, there can be used the corresponding alkali metal mercaptide, e.g. sodium octyl thioglycolate $(NaSCH_2COOC_8H_{17})$ When the alkali metal salt is used, there is formed alkali metal chloride, e.g. NaCl or KCl, and there is no need to employ a tertiary amine.

Compounds within the present invention include: tris(methyl thioglycolyl) phosphite tris(ethyl thioglycolyl) phosphite, tris(propyl thioglycolyl) phosphite, tris(isopropyl thioglycolyl) phosphite, tris(butyl thioglycolyl) phosphite, tris(sec. butyl thioglycolyl) phosphite, tris(amyl thioglycolyl) phosphite, tris(hexyl thioglycolyl) phosphite, tris(cyclohexyl thioglycolyl) phosphite, tris(heptyl thioglycolyl) phosphite, tris(octyl thioglycolyl) phosphite, tris(isooctyl thioglycolyl) phosphite, tris(2-ethylhexyl thioglycolyl) phosphite, tris(nonyl thioglycolyl) phosphite, tris(decyl thioglycolyl) phosphite, tris(isodecyl thioglycolyl)phosphite, tri(lauryl thioglycolyl) phosphite, tris(cetyl thioglycolyl) phosphite, tris(octadecyl thioglycolyl) phosphite, tris(eicosanyl thioglycolyl) phosphite, tris(allyl thioglycolyl) phosphite, tris(methallyl trioglycolyl) phosphite, tris(crotyl thioglycolyl) phosphite, tris(oleyl thioglycolyl) phosphite, tris(linoleyl thioglycolyl) phosphite, tris(linolenyl thioglycolyl) phosphite, tris(2-chloroallyl thioglycolyl) phosphite, tris(2-chloroethyl thioglycolyl) phosphite, tris(2-bromoallyl thioglycolyl) phosphite, tris(4-bromobutyl thioglycolyl) phosphite, tris(phenyl thioglycolyl) phosphite, tris(o-tolyl thioglycolyl) phosphite, tris(m-tolyl thioglycolyl) phosphite, tris(p-tolyl thioglycolyl) phosphite, tris(2,5-dimethylphenyl thioglycolyl) phosphite, tris(2-chlorophenyl thioglycolyl) phosphite, tris(4-chlorophenyl thioglycolyl) phosphite, tris(2,4-dichlorophenyl thioglycolyl) phosphite, tris(2,4,5-trichlorophenyl thioglycolyl) phosphite, tris(2-chloro-4-methylphenyl thioglycol) phosphite, tris(2-bromophenyl) thioglycolyl) phosphite, tris(benzyl thioglycolyl) phosphite, tris(1-naphthyl thioglycolyl) phosphite, tris(2-naphthyl thioglycolyl) phosphite, tris(2-fluorophenyl thioglycolyl) phosphite, tris(4-methylcyclohexyl thioglycolyl) phosphite, tris(methyl beta thiopropionyl) phosphite $(P(SCH_2CH_2COOCH_3)_3)$, tris(ethyl beta thiopropionyl) phosphite, tris(propyl beta thiopropionyl) phosphite, tris(butyl beta thiopropionyl) phosphite, tris(amyl beta thiopropionyl) phosphite, tris(hexyl beta thiopropionyl) phosphite, tris(cyclohexyl beta thiopropionyl) phosphite, tris(isooctyl beta thiopropionyl) phosphite, tris(decyl beta thiopropionyl) phosphite, tris(octadecyl beta thiopropionyl) phosphite, tris(phenyl beta thiopropionyl) phosphite, tris(p-tolyl beta thiopropionyl) phosphite, tris(allyl beta thiopropionyl) phosphite, tris(oleyl beta thiopropionyl) phosphite, tris(benzyl beta thiopropionyl) phosphite, tris(methyl gamma thiobutyryl) phosphite $(P(SCH_2CH_2CH_2COOCH_3)_3)$, tris(butyl gamma thiobutyryl) phosphite, tris(isooctyl gamma thiobutyryl) phosphite, tris(octadecyl gamma thiobutyryl) phosphite, tris(oleyl gamma thiobutyryl) phosphite, tris(allyl gamma thiobutyryl) phosphite, tris(phenyl gamma thiobutyryl) phosphite, tris(o-tolyl gamma thiobutyryl) phosphite, tris(2-ethylhexyl thioglycolyl) phosphite, (methyl thioglycolyl) methylethyl phosphinite

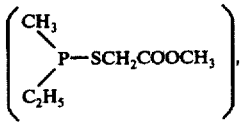

(ethyl thioglycolyl) dimethyl phosphinite, (propyl thioglycolyl) diethyl phosphinite, (butyl thioglycolyl) dibutyl phosphinite, (2-ethylhexyl thioglycolyl) dibutyl phosphinite, (hexyl thioglycolyl) dioctyl phosphinite, (cyclohexyl thioglycolyl) dicyclohexyl phosphinite, (isooctyl thioglycolyl) di(trifluoromethyl) phosphinite, (octadecyl thioglycolyl) diphenyl phosphinite, (oleyl thioglycolyl) di(2,5-dimethylphenyl) phosphinite, (phenyl thioglycolyl) ethyl phenyl phosphinite, (octyl thioglycolyl) di(4-chlorophenyl) phosphinite, (butyl thioglycolyl) di(1-naphthyl) phosphinite, (phenyl thioglycolyl) diphenyl phosphinite, (lauryl thioglycolyl) diphenyl phosphinite, (methyl beta thiopropionyl) dibutyl phosphinite, (ethyl beta thiopropionyl) diphenyl phosphinite, (hexyl beta thiopropionyl) diethyl phosphinite, (cyclohexyl beta thiopropionyl) diphenyl phosphinite, (benzyl beta thiopropionyl) dipropyl phosphinite, (isooctyl gamma thiobutyryl) dibutyl phosphinite, (octadecyl thiobutyryl) diphenyl phosphinite, bis(methyl thioglycolyl) ethane phosphinite $$(C_2H_5P(SCH_2COOCH_3)_2),$$

bis(ethyl thioglycolyl) methane phosphinite, bis(propyl thioglycolyl) ethane phosphinite, bis(butyl thioglycolyl) butane phosphinite, bis(hexyl thioglycolyl) octane phosphinite, bis(cyclohexyl thioglycolyl) cyclohexane phosphinite, bis(isooctyl thioglycolyl) benzene phosphinite, bis(2-ethylhexyl thioglycolyl) benzene phosphinite, bis(octadecyl thioglycolyl) benzene phosphinite, bis(oleyl thioglycolyl) 2,5-dimethylbenzene phosphinite, bis(phenyl thioglycolyl) benzene phosphinite, bis(octyl thioglycolyl) 4-chlorobenzene phosphinite, bis(butyl thioglycolyl) 1-naphthalene phosphinite, bis(lauryl thioglycolyl) benzene phosphinite, bis(methyl beta thiopropionyl) butane phosphinite, bis(ethyl beta thiopropionyl) benzene phosphinite, bis(hexyl beta thiopropionyl) ethane phosphinite, bis(cyclohexyl beta thiopropionyl) benzene phosphinite, bis(benzyl beta thiopropionyl) propane phosphinite, bis(isooctyl gamma thiobutyryl) benzene phosphinite and bis(octadecyl gamma thiobutryl) benzene phosphinite.

Unless otherwise indicated all parts and percentages are by weight.

The compounds of the present invention are also stabilizers for monolefin polymers such as polyethylene, polypropylene, ethylene propylene copolymers (e.g. 50:50 80:20 and 20:80), ethylene-monolefin compolymers wherein the monoolefin has 4–10 carbon atoms and is present in a minor amount, e.g. ethylene-butene-1 copolymer (95:5) and ethylene-decene-1 copolymers (90:10). Furthermore, they can be used to stabilize natural rubber, styrene-butadiene rubber (SRR rubber), e.g. (75% butadiene, 25% styrene) and EPDM rubbers and acrylonitrile-butadiene styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims, the terms nonconjugated polyolefin includes aliphatic unconjugated polyene hydrocarbons, and cycloaliphatic nonconjugated polyene hydrocarbons e.g. endocyclic dienes. Specific examples of suitable nonconjugated polyolefins include penta-diene-1,4; hexadiene-1,4; dicyclopentadiene, methyl cyclopentadiene dimer, cyclododecatriene, cyclooctadiene-1,5; 5-methylene-2-norbornene, ethylidene norbonene, tetrahydroindene.

Specific examples of suitable terpolymers are the Royalenes which contain 55 mole percent ethylene, 40 to 42 mole percent propylene and 3 to 5 mole percent dicyclopentadiene; Enjay terpolymers, e.g. ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Other suitable terpolymers include one containing 50 mole percent ethylene, 47 mole percent propylene and 3 mole percent 1,5-cyclooctadiene (Dutrel) and one containing 62% ethylene, 6% dicyclopentadiene and 32% propylene.

Examples of EPDM rubbers are given in U.S. Pats. 2,933,480; 3,000,866; 3,063,973; 3,093,620; 3,093,621 and 3,136,739, in British Pat. 880,904 and in Belgian Pat. 623,698.

Terpolymers and other EPDM rubbers from ethylene, propylene and dicyclopentadiene are exemplified in Tarney Pat. 3,000,866; Adamek Pat. 3,136,739, Gentile Pat. 3,419,639, and Dunlop (British) Pat. 880,904. EPDM rubbers from ethylene, propylene and 1,4-hexadiene are exemplified in Greshman Pat. 2,933,480. As in Greshman other suitable monoconjugated diolefins are 1,4-pentadiene; 2-methyl-1,5 hexadiene, 3,3-dimethyl-1, 5-hexadiene, 1,7-octadiene, 1,9-decadiene, 1,19-eicosadiene, 1,9-octadecadiene, 6-methyl-1,5-heptadiene, methyl-1,6-octadiene, 11-ethyl-1,11-tridecadiene.

EPDM rubbers from ethylene, propylene and 5-methyl-2-norbornene are exemplified in U.S. Pat. 3,093,621. Suitable norbornadiene, e.g. 2-methyl norbornadiene, 2-ethyl norbornadiene, 2-n-heptyl norbornadiene are shown in Gladding Pat. 3,063,973 and bicyclo compounds such as bicyclo (2,2,2) heptadiene-2,5 are shown in Dunlop (British) Pat. 880,904. The use of cyclooctadiene-1,5 and other cyclodienes is shown in Montecatini (Belgium) Pat. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9-cyclododecatriene, 1-methyl-1,5-cyclooctadiene.

The compounds of the present invention are normally employed in an amount of at least 0.01% and usually 0.1% to 10% by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10%, preferably 0.1–5%. Thus there can be used pentaerythritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl-3,3'-thiodipropionate, dicetyl- 3,3'-thiodipropionate, dioctyl-3,3'-thiodipropionate, dibenzyl-3,3'-thiopdipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate lauryl-3-benzothiazylmercaptopropionate. Preferably the esterify alcohol is an alkanol having 10 to 18 carbon atoms. Other esters of beta thiocarboxylic acids set forth in Gribbins Pat. 2,519,744 can also be used.

Other beta thiocarboxylic acids include stearyl (1,2-dicarboethoxyethylthio) acetate, stearyl (1,2-dicarbolauryloxyethylthio) acetate or the like. Compounds of this type can be made by additional alkyl ester of mercapto-acetic acid to a dialkyl ester of maleic acid. Similar beta thiocarboxyl compounds can be used which are made by addition of an RSH compound across the maleic ester double bond and where R is alkyl, aryl, alkylcarboxylalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similarly useful beta thiocarboxyl synergistic compounds can be prepared by addition of the RSH (mercaptan) compounds as defined above across the double bond of dialkyl itaconates, citraconates, fumarates or trialkyl aconitates, e.g. the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the additional product of the lauryl ester of mercaptopropionic acid with triethyl aconitate.

The thermal stability of the polypropylene and other monoolefin polymers is adversely affected by impurities including residual catalyst. When thermal stability is important in addition to oxidative stability, it has been found valuable to include polyvalent metal salts of fatty acids in an amount of 0.01–10% preferably 0.1–5%, in the monoolefin polymer formulations. Examples of such salts are calcium stearate, calcium 2-ethylhexoate, calcium octate, calcium oleate, calcium ricinoletate, calcium myristate, calcium palmitate, calcium laurate, barium laurate, barium sterate, magnesium stearate as well as zinc stearate, cadmium laurate, cadmium octoate, cadmium stearate, barium ricinoleate, zinc caprylate, cadmium caproate, zinc 2-ethylhexoate.

There can also be added phenolic antioxidants in an amount of 0.01–10%, preferably 0.1–5%. Examples of such phenols include 2,6-di-t-butyl-p-cresol,
butylated hydroxyanisole,
propyl gallate,
4,4'-thiobis(6-t-butyl-m-cresole),
4,4'-isopropylidene bisphenol,
4,4'-cyclohexylidene diphenol,
2,5-di-t-amyl hydroquinone,
4,4'-butylidene bis(6-t-butyl-m-cresol),
hydroquinone monobenzyl ether,
2,2'-methylene-bis(4-methyl-6-t-butylphenol),
2,6-butyl-4-decyloxyphenol,
2-t-butyl-4-dodecyloxyphenol,
2-t-butyl-4-octadecyloxyphenol,
4,5'-methylene-bis(2,6-di-t-butylphenol),
p-aminophenol,
N-lauryloxy-p-aminophenol,
4,4'-thiobis(3-methyl-6-t-butylphenol),
bis[o-(1,1,3,3-tetramethylbutyl)phenol]sulfide,
4-acetyl-$\beta$-resorcylic acid,
A stage p-t-butylphenolformaldehyde resin,
4-dodecyloxy-2-hydroxybenzophenone,
3-hydroxy-4-(phenylcarbonyl)phenyl palmitate,
n-dodecyl ester of 3-hydroxy-4-(phenylcarbonyl) phenoxyacetic acid, and
t-butylphenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resin (epichlorhydrin-diphenylolpropane resins), phenoxy-propylene oxide, butoxy-propylene oxide, epoxidized neopentylene oleate, glycidyl epoxystearate, epoxidized $\alpha$-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

The compounds of the present invention can also be employed in conjunction with other phosphorus compounds, particularly phosphites and thiophosphites as antioxidants and stabilizers. The phosphite or thiophosphite is employed in an amount of 0.01 to 10% of the polymer (or other material) being stabilized. Thus there can be employed tristearyl phosphite, trilauryl trithiophosphite, trilauryl phosphite, tri(nonylphenol) phosphite, tris(4-methylthio-phenyl) phosphite, or any of the phosphites or thiophosphites in Friedman Pat. 3,039,993, Friedman Pat. 3,047,608, Friedman Pat. 3,053,878 or Larrison Pat. 3,341,629. The entire disclosure of these four patents is hereby incorporated by reference.

EXAMPLE 1

Tris(isooctyl thioglycolyl) phosphite $P(SCH_2COOC_8H_{17})_3$ 509.0 grams (2.5 moles) of isooctyl thioglycolate, 200.0 grams (2.53 moles) of pyridine and 800 ml. of toluene were placed in a 3-necked two-liter flask, 109.5 grams (0.8 mole) of $PCl_3$ was then added dropwise with cooling at 27–0° C. After the addition was complete, the slurry was heated to 60° C. and then cooled. One liter of water was then added to dissolve the pyridinium hydrochloride formed. The aqueous layer was drawn off and the toluene layer was stripped under vacuum to 155° C, and 2 mm. The product was treated with soda ash and filter aid and filtered. The liquid product of the invention had the following properties.

| | |
|---|---|
| Refraction, index, $n_D^{25}$ | 1.5030 |
| Specific gravity | 1.045 |
| Acid No. | 0.20 |
| Color (APHA) | 20 |
| Phosphorus (percent) | 4.7 |
| Sulfur (percent) | 15.1 |

EXAMPLE 2

Tris(octadecyl thioglycolyl) phosphite $P(SCH_2COOC_{18}H_{37})_3$

Using the apparatus of Example 1, there were added 413 grams of octadecyl thioglycolate, 92 grams of pyridine and 400 ml. of toluene, 50.0 grams of $PCl_2$ were added dropwise while maintaining the temperature below 50° C. The slurry was then heated to 60° C. for 1 hour. 500 cc. of water were added to dissolve the pyridinium hydrochloride, the aqueous layer was drawn off and the product layer rewashed with 500 cc. of water. Volatiles were then removed to 160° C. at 2 mm. The product was a yellow waxy solid, M.P. 25.5° C. Phosphorus, 2.8% (theory 3.0%); sulfur 9.1% (theory 9.3).

EXAMPLE 3

Tris(isooctyl thiopropionyl) phosphite $P(SCH_2CH_2COOC_8H_{17})_3$

The procedure of Example 2 was repeated using 2.5 moles of isooctyl beta thiopropionate, 2.53 moles of pyridine, 800 ml. of toluene and 0.8 mole of $PCl_3$ and the tris(isooctyl thiopropionyl) phosphite recovered as a liquid.

EXAMPLE 4

Tris(ethyl thioglycolyl) phosphite

The procedure of Example 1 was repeated using 2.5 moles of ethyl thioglycolate, 2.53 moles of pyridine, 800 ml. of toluene and 0.8 mole of $PCl_3$ and the tris(ethyl thioglycolyl) phosphite recovered as a liquid.

EXAMPLE 5

Bis(isooctyl thioglycolyl) butane phosphinite $C_4H_9P(SCH_2COOC_8H_{17})_2$

The procedure of Example 1 was repeated using 1.67 moles of isooctyl thioglycolate, 1.70 moles of pyridine, 600 ml. of toluene and 0.8 mole of butane phosphorus dichloride ($C_4H_9PCl_2$) and the bis(isooctyl thioglycolyl) butane phosphinite recovered as a liquid.

EXAMPLE 6

(Isooctyl thioglycolyl) dibutyl phosphinite $(C_4H_9)_2PSCH_2COOC_8H_{17}$

The procedure of Example 1 was repeated using 0.81 mole of isooctyl thioglycolate, 0.83 mole of pyridine, 500 ml. of toluene and 0.8 mole of dibutyl phosphinous dichloride and the (isooctyl thioglycolyl) dibutyl phosphinite recovered as a liquid.

EXAMPLE 7

1 part of the product of Example 3 was mixed with 100 parts of polypropylene to stabilize the polymer.

EXAMPLE 8

1 part of the product of Example 4 was mixed with 100 parts of natural rubber to stabilize the rubber.

EXAMPLE 9

1 part of the product of Example 1 was mixed with 100 parts of EPDM rubber (55 mole percent ethylene, 41 mole percent propylene and 4 mole percent dicyclopentadiene) to stabilize the rubber.

EXAMPLE 10

100 parts of propylene (Profax 6501, melt index 0.4) was mixed with a stabilizer consisting of 0.2 part of the product of Example 1, 0.2 part dilaurylthiodipropionate and 0.2 part of calcium stearate to give a polypropylene of improved heat stability, e.g. at 133° C.

EXAMPLE 11

100 parts of polypropylene (Profax 6501, melt index 0.4) were mixed with a stabilizer consisting of 0.25 part of the product of Example 2 and 0.25 part of dilauryl thiodipropionate to give a polypropylene of improved stability.

EXAMPLE 12

100 parts of polypropylene (Profax 6501, melt index 0.4) was mixed with a stabilizer consisting of 0.2 part of the product of Example 3, 0.2 part of dilaurylthiodipropionate and 0.2 part of 2,2'-methylene bis(4-methyl-6-t-butylphenol).

EXAMPLE 13

A formulation was made by compounding in a Banbury mixer 100 parts of polypropylene (Profax 6501, reduced specific viscosity (RSV)) 3.0, melt index 0.4, ASTM D123857T at 190° C., 0.1 part of calcium stearate, 0.1 part of the hindered phenol Irganox 1076 (octadecyl 3-(3,5-di-t-butyl hydroxyphenyl) propionate) and 0.25 part of tris(isoctyl thioglycolyl) phosphite. The mixture was then milled on a 2-roll mill and fluxed for 5 minutes at 180° C. and milled to form a sheet. The product was resistant to heat aging in air at 150° C. as indicated by less color formation than a similar sample of unmodified Profax 6501.

EXAMPLE 14

The procedure of Example 13 was repeated but using the product of Example 5 in place of the tris(isooctyl thioglycolyl) phosphite to obtain a polypropylene having improved heat aging properties in air.

EXAMPLE 15

The procedure of Example 13 was repeated but using the product of Example 6 in place of the tris(isooctyl thioglycolyl) phosphite to obtain a polypropylene having improved heat aging properties in air.

EXAMPLE 16

| | Parts |
|---|---|
| EPDM rubber (62% ethylene, 32% propylene, 6% dicyclopentadiene, intrinsic viscosity of 2.1 in Tetralin at 135° C.) | 100 |
| 4,4'-isopropylidene bisphenol | 0.1 |
| DLTDP (dilaurylthiodipropionate) | 1.0 |
| Tris(isooctyl thiopropionyl)phosphite | 1 |

The above materials were mixed together and sheeted out on a rubber mill to give a product having better heat aging properties when tested in an oxygen atmosphere at 150° C. than the EPDM rubber alone.

The thiophosphites of the present invention can also be used with ultraviolet light absorbers in monoolefin or polyolefin polymer compositions to give products with improved heat and light stability such as those set forth in McNally application 54,859 filed July 14, 1970 (and corresponding Belgian Pat. 769,922 and German Offenlegungsschrift 2,133,493 Apr. 6, 1972) in place of the thiophosphite stabilizers set forth therein. The entire disclosure of said McNally application and German Offenlegungsschrift is hereby incorporated by reference.

Thus a suitable formulation having increased weathering stability is a blend of 100 parts of polypropylene (Profax 6501), 0.1 part of calcium stearate, 0.1 part of Irganox 1076, 0.25 part of tris (isooctyl thioglycolyl) phosphite and 0.25 part of 2-hydroxy-4-n-octoxybenzophenone (Cyasorb 531, and ultraviolet light absorber). This formulation was sheeted off a hot two roll mill to give films 10–12 inches thick. These films are compression molded to give samples for Weatherometer tests, e.g. at 60–66° C. using a carbon arc, emission at approximately 2478 A. as the light source and "weathering" for 4 hours "sunlight" alternating with one hour of rain, humidity 30–35% during light hours, 100% during combined light and rain hours until the product was no longer stable.

In place of Weatherometer testing, the composition can also be tested in outdoor weather testing to determine the effect of ultraviolet light. What is claimed is:

1. A composition comprising a member of the group consisting of solid monolefin polymers containing a stabilizingly effective amount of a compound having one of the formulae:

[(a) $P(S(CH_2)_nCOOR_1)_3$]

[(b)] *(a)* $R_2P(S(CH_2)_nCOOR_1)_2$

-continued

[(c)] *(b)* $R_2R_3P-S(CH_2)_nCOOR_1$ wherein n is an integer and $R_1$, $R_2$ and $R_3$ are hydrocarbyl or halohydrocarbyl[.] *with the proviso that when the formula is (a) $R_2$ is alkyl, alkenyl or cycloalkyl.*

2. A composition according to claim 1 wherein n is 1, 2 or 3.

3. A composition according to claim 2 where the compound has Formula (a).

[4. A composition according to claim 2 wherein $R_1$, $R_2$ and $R_3$ are alkyl, haloalkyl, aryl, haloaryl, alkenyl, aralkyl, haloalkenyl or cycloalkyl.]

[5. A composition according to claim 4 where n is 1.]

[6. A composition according to claim 5 where $R_1$ is alkyl of 1 to 20 carbon atoms.]

[7. A composition according to claim 6 where $R_1$ is alkyl of 8 to 18 carbon atoms.]

8. A composition according to claim 2 wherein the compound has (b).

[9. A composition according to claim 2 wherein the compound has (c).]

10. A composition according to claim 2 wherein the polymer consists of carbon and hydrogen.

11. A composition according to claim 10 wherein the polymer is a monoolefin homopolymer, a copolymer of monomers consisting of a plurality of monoolefins or an ethylene-propylene-non-conjugated polyene terpolymer.

12. A composition according to claim 11 wherein the polymer is polypropylene.

[13. A composition according to claim 12 wherein the compound has Formula (a) and $R_1$ is alkyl.]

14. A composition according to claim 12 wherein the compound has Formula (b).

[15. A composition according to claim 12 wherein the compound has Formula (c).]

16. A composition according to claim 12 wherein the compound has Formula (a).

17. A composition according to claim 12 wherein $R_1$, $R_2$ and $R_3$ are alkyl, haloalkyl, aryl, haloaryl, alkenyl, aralkyl, haloalkenyl or cycloalkyl.

18. A composition according to claim 12 wherein $R_1$ is alkyl of 8 to 18 carbon atoms and n is 1 or 2.

*19. A composition according to claim 1 wherein n is 1.*

*20. A composition according to claim 19 wherein $R_1$ is alkyl of 8 carbon atoms.*

*21. A composition according to claim 19 wherein $R_1$ is alkyl of 10 carbon atoms.*

*22. A composition according to claim 1 wherein n is 2.*

*23. A composition according to claim 22 wherein $R_1$ is alkyl of 8 carbon atoms.*

*24. A composition according to claim 22 wherein $R_1$ is alkyl of 10 carbon atoms.*

*25. A composition according to claim 1 wherein the compound has formula (a) and $R_2$ is alkyl.*

*26. A composition according to claim 1 wherein the compound has formula (a) and $R_2$ is alkenyl.*

*27. A composition according to claim 1 wherein the compound has formula (a) and $R_2$ is cycloalkyl.*

* * * * *